Patented Feb. 15, 1944

2,341,553

UNITED STATES PATENT OFFICE 2,341,553

POLYVINYL CYANOETHYL ETHER

Ray C. Houtz, Snyder, N. Y., assignor to E. I. du Pont de Nemours & Company, Wilmington, Del., a corporation of Delaware No Drawing. Application October 29, 1942, Serial No. 463,847

22 Claims. (Cl. 260—90)

This invention relates to polyvinyl ethers, and in particular to novel ethers which may be obtained by reacting polyvinyl alcohol with vinyl cyanide.

It has been proposed heretofore to react an aqueous solution of a polyvinyl alcohol with vinyl cyanide whereby part of the hydroxyl groups of the polyvinyl alcohol react to form beta-cyanoethyl ether groups. The polyvinyl ethers thus formed by this reaction are viscous liquids soluble in water and have less than 20% of the hydroxyl groups of the polyvinyl alcohol converted into the cyanoethyl ether groups.

An object of the present invention is a new and improved method for reacting polyvinyl alcohol with vinyl cyanide. Another object is to react vinyl cyanide with polyvinyl alcohol so as to obtain polyvinyl cyanoethyl ethers having up to 100% of the hydroxyl groups converted into cyanoethyl ether groups. A further object is to produce a series of novel polyvinyl cyanoethyl ethers which are substantially insoluble in water, alcohols, hydrocarbons, and chlorinated hydrocarbons. A further object is to provide a method for reacting polyvinyl alcohol with vinyl cyanide whereby 20% or more of the hydroxyl groups of the polyvinyl alcohol may be converted to cyanoethyl ether groups. Other objects will be hereinafter apparent.

The above objects may be attained in accordance with the present invention by reacting solid polyvinyl alcohol with vinyl cyanide in the presence of a small amount of an aqueous solution of an alkali containing insufficient water to dissolve the polyvinyl alcohol. In practicing this invention the amount of water utilized preferably is sufficient to dissolve the alkali catalyst, but in any case, the amount of water is less than 50% by weight of the polyvinyl alcohol initially in the reaction mixture. As catalyst for the reaction, I prefer to use sodium hydroxide or other alkali metal hydroxide, but, if desired, other soluble alkalis may be used, for example, alkaline earth metal hydroxides (e. g., barium hydroxide), quaternary ammonium bases, alkaline salts such as alkali metal cyanides, carbonates, acetates and other alkali salts of weak acids. The alkaline catalyst may be added in dilute or concentrated solution depending upon the degree of catalytic activity desired. For example, solutions containing 0.5 to 20% by weight of alkali metal hydroxide are suitable, but the invention is not restricted to any particular alkali concentration.

It is preferable to have present in the reaction mixture, a solvent for the polyvinyl cyanoethyl ether product. For this purpose, I may have present an excess of vinyl cyanide or I may add another material which is a solvent for the product, for example, acetone; a low molecular weight fatty acid ester, such as methyl acetate; or a polyether, for example, dioxane. After the reaction is complete, the product may be obtained by distilling off the solvent or by precipitation with a non-solvent.

The products of my invention are tough, rubbery materials, soluble in the solvents indicated above, but insoluble in water, alcohols, hydrocarbons, and chlorinated hydrocarbon solvents. Although insoluble in water, the products are somewhat water-sensitive and tend to swell in contact with an excess of water, but without dissolving therein. The products have adhesive properties and may be used either alone but preferably in mixtures with plasticizers, solvents, other adhesives and the like in the manufacture of various adhesive compositions, including pressure-sensitive adhesives. For example, films cast from its acetone solution are plastic and sticky, adapted to serve as pressure-sensitive adhesives. Since vinyl cyanide has been known invariably to react with alcohols to produce beta-cyanoethyl ethers, I believe my products to be beta-cyanoethyl ethers of polyvinyl alcohol.

In a preferred method of practicing the invention, finely divided solid polyvinyl alcohol is mixed with a large excess of vinyl cyanide and a small amount of dilute sodium hydroxide solution is added to the resulting suspension to serve as catalyst. The reaction occurs only slowly at room temperature and for best results, the reaction mixture must be heated to initiate a desirably rapid reaction. The reaction is somewhat exothermic and the rapidity with which the reaction occurs will depend upon the amount of the alkali catalyst present. Preferably the reaction mixture is heated to the boiling point of vinyl cyanide, in a vessel fitted with a reflux condenser. As the reaction commences, the polyvinyl alcohol starts to go into solution and at the end of the reaction, which ordinarily will require from 1 to 1½ hours, the polyvinyl alcohol will have completely disappeared, the reaction having formed a solution of the product in the excess vinyl cyanide.

The product may be separated from the solution in various ways. For example, the vinyl cyanide may simply be evaporated off, leaving the product as a non-volatile residue. In order to avoid having the product contaminated with the catalyst, the liquid reaction product may be poured into a 50% aqueous solution of ethyl alcohol, or other liquid which is a solvent for vinyl cyanide but a non-solvent for the product, whereupon the product is formed as a precipitate. The precipitated product may be washed with water to remove all traces of alkali and dried.

I have found that my process invariably results in a polyvinyl cyanoethyl ether in which 20% or more of the hydroxyl groups of the polyvinyl alcohol are converted to the cyanoethyl ether groups, and the products are substantially water insoluble. On the other hand, when an aqueous polyvinyl alcohol solution is reacted with vinyl cyanide under similar conditions, it has not been possible to replace as much as 20% of the hydroxyl groups with the cyanoethyl ether groups and the resulting product is soluble in water.

In practicing my invention, the number of alkyl hydroxyl groups which can be converted to cyanoethyl groups may be varied from 20% to 100%, as desired. For example, I may thus produce a polyvinyl cyanoethyl ether containing about .5% by weight of nitrogen which is equivalent to conversion of 20% of the hydroxyl groups to the ether groups. I may produce a product containing approximately 14.4% by weight of nitrogen, which is equivalent to substantially complete conversion of the hydroxyl groups to ether groups or I may obtain various products lying between these two extremes. My preferred product contains approximately 13% to 14.4% by weight of nitrogen, equivalent to from about 80% to 100% conversion of hydroxyl groups to cyanoethyl ether groups.

One method of regulating the degree of conversion of hydroxyl groups to ether groups comprises stopping the reaction by adding an acidic material to destroy the alkaline catalyst. Any acidic material is suitable for this purpose, for example, a dilute solution of a strong mineral acid such as hydrochloric acid or sulfuric acid, an organic acid or a solution of an acidic solid such as zinc chloride, ammonium chloride, or the like. In another method, the polyvinyl alcohol is reacted with the calculated amount of vinyl cyanide required to produce the desired product, preferably dissolved in a solvent for the product, for example, acetone, dioxane, or the like.

My invention is further illustrated by the following examples:

Example I

A mixture of 4.5 parts of medium viscosity polyvinyl alcohol, 80 parts of acrylonitrile and 1 part of a 1% aqueous solution of sodium hydroxide is placed in a closed reaction vessel fitted with a mechanical stirrer and reflux condenser. The reaction mixture is stirred continuously and heated externally at reflux temperature for 1 hour. At this time one part of 5% aqueous sodium hydroxide solution is added and the stirring and heating continued. Within 30 minutes the polyvinyl alcohol begins to go into solution and at the end of a total of 1½ hours after the second addition of sodium hydroxide, the polyvinyl alcohol is all in solution. The resulting solution is poured into 500 parts of a 50% aqueous solution of ethyl alcohol to precipitate the cyanoethyl ether. The product is washed with water and dried overnight in a vacuum desiccator over phosphorus pentoxide. There is obtained 7 parts of a polyvinyl cyanoethyl ether which is light straw-yellow in color and contains 13.16% nitrogen.

Example II

A mixture of 100 parts of low viscosity polyvinyl alcohol, 159 parts of acrylonitrile, 288 parts of acetone and 20 parts of a 5% aqueous solution of sodium hydroxide is placed in a closed reaction vessel, fitted with a mechanical stirrer, reflux condenser and external means for heating. The reaction mixture is stirred continuously and heated to reflux temperature. After 1¼ hours at reflux temperature the polyvinyl alcohol begins to form a gel. At the end of 1½ hours another 79 parts of acetone is added and the reaction continued. At the end of 2 hours the resulting solution is poured into about 5,000 parts of cold water with vigorous stirring. The resulting taffy-like product is washed successively with water, ethyl alcohol and water in a W & P type mixer. After thorough drying, this cyanoethyl ether of polyvinyl alcohol is light yellow in color and contains 13.87% nitrogen.

Example III

A mixture of 9 parts of low viscosity polyvinyl alcohol and 53 parts of acrylonitrile is heated to reflux temperature in a closed reaction vessel fitted with a mechanical stirrer and reflux condenser. As soon as the mixture begins to reflux, 2 parts of a 9% solution of sodium cyanide in water is added and in 10 minutes a clear yellow solution is obtained. At the end of 25 minutes total reflux time the resulting clear solution is poured into 50% aqueous alcohol with vigorous agitation. The resulting precipitate is washed thoroughly with water and dried in a vacuum desiccator over phosphorous pentoxide. This product is light yellow in color and contains 14.1% nitrogen.

Example IV

A slurry of 45 parts of high viscosity polyvinyl alcohol, 265 parts of acrylonitrile, and 5 parts of a 5% aqueous solution of sodium hydroxide is placed in a closed reaction vessel fitted with a mechanical stirrer and reflux condenser. The reaction vessel is heated externally and in about ½ hour after the mixture begins to reflux, the polyvinyl alcohol starts going into solution and forms a gel. After another 15 minutes at reflux temperature the external heat is discontinued and the reaction mixture allowed to cool for 10 minutes whereupon 10 parts of glacial acetic acid is added to the reaction mixture to neutralize the catalyst. The resulting viscous light tan-colored liquid is poured into about 2,000 parts of diethyl ether and a taffy-like precipitate is obtained. This precipitate is redissolved in about 300 parts of acetone and reprecipitated in diethyl ether. The ether is then removed in a vacuum over phosphorous pentoxide. The light colored product amounts to 95 parts and contains 13.84% nitrogen.

The amount of alkali utilized as catalyst will depend upon the rapidity of reaction desired. Generally, an amount of dissolved alkali metal hydroxide equal to at least 0.01% by weight of the polyvinyl alcohol is required for a reasonable reaction rate. I generally prefer to use about 1 to 5%. It is preferable to avoid too large amounts of catalyst since if the reaction is too rapid, an excessive amount of heat is generated and the resulting product tends to be discolored. Preferably, the alkali metal hydroxide solution should have a concentration not over about 20% by weight and the amount of the alkali metal hydroxide should be not greater than about 10% of the weight of the polyvinyl alcohol initially present in the reaction mixture. If desired, more concentrated solutions of the alkali may be used or larger amounts of the alkali may be used, but generally, the reaction temperature then becomes difficult to control and the product tends to be discolored. The amount of water in the reaction mixture must equal not more than 50% and not less than around 1% by weight, of the polyvinyl alcohol initially in the reaction mixture, preferably about 10 to 30%. I prefer to utilize as catalyst, a 1–10% by weight aqueous solution of sodium hydroxide containing an amount of water equal to about 10–30% by weight of the polyvinyl alcohol initially in the reaction mixture. Under these conditions, the reaction may be carried out at temperatures below 100° C., and will be complete within one to several hours to produce a product which has little discoloration and has excellent physical properties. It is understood that catalysts other than alkali metal hydroxides are used in amounts substantially equivalent to those given above.

The reaction preferably is carried out at a temperature within the range of 50 to 100° C. At lower temperatures the reaction is slower than generally desired. At temperatures above 100° C., the tendency for the product to discolor is increased and above 200° C. excessive decomposition is apt to occur. Generally I prefer to operate at the atmospheric boiling point of the reaction mixture.

The various grades of polyvinyl alcohol, regardless of solubility in water are suitable for practicing my invention. My invention includes the reaction of vinyl cyanide, as herein described, with any polymeric compound having a plurality of the groups: —CH(OH)—CH$_2$—. By my method, the vinyl cyanide reacts with 20 to 100% of such groups in the polymeric molecule to form polyvinyl beta-cyanoethyl ethers containing a plurality of the groups:

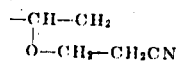

The same molecule may also contain other groups derived by conversion of hydroxyl groups. Thus, for example, the herein described reaction with vinyl cyanide is applicable to the so-called "partial" esters, ethers and acetals of polyvinyl alcohol, in which less than all of the hydroxyl groups of polyvinyl alcohol are replaced by ester, ether, or acetal groups. Examples are: partially hydrolyzed polyvinyl esters, e. g. incompletely hydrolyzed polyvinyl acetate; partial ethers of polyvinyl alcohol containing both ether and free hydroxyl groups, where the ether group may contain an alkyl radical such as methyl, ethyl, etc., or a substituted alkyl, exemplified by the cyanoethyl ethers of the present invention; and partial acetals made by reacting polyvinyl alcohol with an aldehyde such as formaldehyde, acetaldehyde or butyraldehyde. I may also utilize polyvinyl copolymers having the polyvinyl alcohol group —CH(OH)CH$_2$— copolymerized with other groups, for example, polyvinyl compounds made by hydrolyzing copolymers of vinyl esters and other compounds capable of copolymerizing with vinyl esters. Such polyvinyl resins containing a plurality of the groups —CH(OH)—CH$_2$— and other groups, which for convenience are designated as polyvinyl alcohol copolymers, include, for example, copolymers of: acrylic acid, alkyl substituted acrylic acid and their esters, nitriles, amides and imides; vinyl aryls such as styrene; vinyl halides and esters; and the like. In short, any polyvinyl compound containing a plurality of free hydroxyl groups, with or without combined hydroxyl groups or other groups, may be reacted with vinyl cyanide in accordance with my herein described process to obtain my new and useful polymeric compounds. By selecting the polyvinyl alcohol compound thus to be reacted, the properties of the product can be accordingly modified, so that a great number of variations are possible within the scope of my invention. These products are useful as adhesives, ingredients of coating compositions, plastics and the like.

I claim:

1. As a new composition of matter, a substantially water-insoluble polyvinyl resin, having in its molecular structure a plurality of groups having the formula:

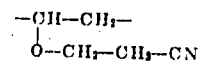

2. As a new composition of matter, a substantially water-insoluble polyvinyl resin, having in its molecular structure a plurality of groups having the formula:

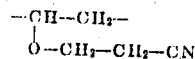

together with other polyvinyl groups.

3. The composition of claim 1 in which the number of said groups is equivalent to a nitrogen content of at least about 5% by weight.

4. The composition of claim 1 in which the number of said groups is such that the composition contains about 13 to 14.43% by weight of combined nitrogen.

5. A new polyvinyl resin derived from polyvinyl alcohol, in which at least about 20% of the original hydroxyl groups are chemically combined with vinyl cyanide.

6. A new polyvinyl resin derived from polyvinyl alcohol, in which 80 to 100% of the original hydroxyl groups are chemically combined with vinyl cyanide.

7. A polyvinyl beta-cyanoethyl ether containing about 5 to 14.4% by weight of combined nitrogen.

8. A polyvinyl beta-cyanoethyl ether containing about 13 to 14.4% by weight of combined nitrogen.

9. A polyvinyl cyanoethyl ether having a number of cyanoethyl groups equivalent to a nitrogen content of about 5 to 14.4% by weight.

10. A polyvinyl cyanoethyl ether having a number of cyanoethyl groups equivalent to a nitrogen content of about 13 to 14.3% by weight.

11. A beta-cyanoethyl ether of polyvinyl alcohol in which at least about 20% of the hydroxyl groups are cyanoethylated.

12. A beta-cyanoethyl ether of polyvinyl alcohol in which 80 to 100% of the hydroxyl groups are cyanoethylated.

13. The process which comprises reacting a solid polyvinyl compound having a plurality of groups: —CH(OH)—CH$_2$— with vinyl cyanide in liquid phase in the presence of a catalyst comprising a water soluble alkali and an amount of water not exceeding about 50% by weight of said polyvinyl compound.

14. The process which comprises reacting a solid polyvinyl alcohol copolymer having a plurality of groups: —CH(OH)—CH$_2$— with vinyl cyanide in liquid phase in the presence of a catalyst comprising a water soluble alkali and an amount of water not exceeding about 50% by weight of said polyvinyl compound.

15. The process which comprises reacting a solid polyvinyl compound having a plurality of groups: —CH(OH)—CH$_2$— with vinyl cyanide in liquid phase in the presence of an alkali metal hydroxide and an amount of water not exceeding about 50% by weight of said polyvinyl compound.

16. The process for preparing a cyanoethyl ether of polyvinyl alcohol which comprises reacting solid polyvinyl alcohol with vinyl cyanide in a non-aqueous liquid medium in the presence of a catalyst comprising a water soluble alkali and an amount of water not exceeding about 50% by weight of said polyvinyl alcohol.

17. The process for preparing a cyanoethyl ether of polyvinyl alcohol which comprises reacting solid polyvinyl alcohol with vinyl cyanide in a non-aqueous liquid medium in the presence of a catalyst comprising an aqueous alkali metal hydroxide solution in an amount equal to not more than about 50% by weight of said polyvinyl alcohol.

18. The process for preparing a cyanoethyl ether of polyvinyl alcohol which comprises heating solid polyvinyl alcohol with vinyl cyanide in the presence of an aqueous alkali metal hydroxide solution containing an amount of water equal to not more than about 50% by weight of said polyvinyl alcohol.

19. The process for preparing a cyanoethyl ether of polyvinyl alcohol which comprises heating solid polyvinyl alcohol with a solution of vinyl cyanide in a non-aqueous solvent in the presence of an aqueous alkali metal hydroxide solution containing an amount of water equal to not more than about 50% by weight of said polyvinyl alcohol, at a temperature of about 50 to 100° C.

20. The process for preparing a cyanoethyl ether of polyvinyl alcohol which comprises heating solid polyvinyl alcohol with vinyl cyanide in the presence of an aqueous alkali metal hydroxide solution containing an amount of water equal to not more than about 50% by weight of said polyvinyl alcohol and containing an amount of alkali equivalent to not more than about 0.10 part by weight of sodium hydroxide for each part by weight of polyvinyl alcohol initially in the reaction mixture.

21. The process for preparing a cyanoethyl ether of polyvinyl alcohol which comprises heating solid polyvinyl alcohol with an excess of vinyl cyanide at a temperature approximately equal to the boiling point of the latter in the presence of an aqueous 1 to 20% solution of alkali metal hydroxide containing water in amount equal to about 10 to 30% of the weight of said polyvinyl alcohol.

22. The process for preparing a cyanoethyl ether of polyvinyl alcohol which comprises reacting solid polyvinyl alcohol with vinyl cyanide in the presence of a solvent for said cyanoethyl ether and of an aqueous 1 to 20% solution of alkali metal hydroxide containing water in amount equal to about 10 to 30% of the weight of said polyvinyl alcohol, at a temperature of about 50 to 100° C.

RAY C. HOUTZ.